United States Patent [19]

Hummel

[11] Patent Number: 5,643,089

[45] Date of Patent: Jul. 1, 1997

[54] NON-JARRING TORQUE WRENCH WITH REMOVABLE OUTPUT SHAFT

[75] Inventor: Scott R. Hummel, 1818 Jennings St., Bethlehem, Pa. 18017

[73] Assignee: Scott R. Hummel, Bethlehem, Pa.

[21] Appl. No.: 545,356

[22] Filed: Oct. 19, 1995

[51] Int. Cl.$^6$ .................................................. F16D 7/04
[52] U.S. Cl. .................................................. 464/37; 81/480
[58] Field of Search ........................... 464/30, 37; 81/480

[56] References Cited

U.S. PATENT DOCUMENTS

| | | |
|---|---|---|
| 2,158,728 | 5/1939 | Peters . |
| 2,326,347 | 8/1943 | Forss . |
| 2,501,648 | 3/1950 | Ogden ........................ 464/37 X |
| 2,503,499 | 4/1950 | Livermont ................... 464/37 X |
| 2,768,547 | 10/1956 | Noell ........................... 464/37 X |
| 2,826,107 | 3/1958 | Woods . |
| 2,972,271 | 2/1961 | Gill . |
| 3,132,730 | 5/1964 | Dahlstrand et al. ......... 464/37 X |
| 3,651,718 | 3/1972 | Thomasian .................. 81/480 |
| 3,662,628 | 5/1972 | Schnepel . |
| 3,922,935 | 12/1975 | Dahlem ........................ 81/480 |
| 4,238,978 | 12/1980 | Leone .......................... 81/480 |
| 4,262,501 | 4/1981 | Vaughn et al. . |
| 4,572,041 | 2/1986 | Rissmann . |
| 4,759,122 | 7/1988 | Weintraub . |
| 4,776,246 | 10/1988 | Elliston . |
| 4,779,493 | 10/1988 | White . |

*Primary Examiner*—Daniel P. Stodola
*Assistant Examiner*—Eileen A. Dunn
*Attorney, Agent, or Firm*—Amster, Rothstein & Ebenstein

[57] ABSTRACT

A torque wrench has a non-jarring design such that it resets without jarring the output shaft after it delivers the preset maximum torque, it accommodates interchangeable output shafts so that a variety of different drive tips may be employed with the same handle, and it has a variable limiting torque value because it can accommodate interchangeable output shafts having uniquely designed cam surfaces.

17 Claims, 6 Drawing Sheets

NON-JARRING TORQUE WRENCH WITH REMOVABLE OUTPUT SHAFT

BACKGROUND OF THE INVENTION

The present invention relates to a torque wrench and, more particularly, to an improved torque wrench which is non-jarring, has a variable limiting torque value and/or accommodates interchangeable output shafts.

Torque wrenches, come in a variety of different configurations—for example, the "T" shape wherein the longitudinal member is the output shaft and the transverse bar member is the handle, or the "L" shape wherein the longitudinal member is the output shaft and the half transverse bar member is the handle. However, all of these torque wrenches have in common the feature that manual torque applied to the handle is converted into a rotary motion of the output shaft, with the output torque not exceeding a predetermined value. Ideally, a torque wrench would have each of the following three features.

First, the torque wrench should be capable of driving a plurality of drive tips disposed at the free end of the output shaft. For example, different drive tips may be used for driving a male or female hex, Philips, flat blade, or any other drive configuration. This feature enhances the versatility and hence the value of the torque wrench since the same torque wrench may be used for a wide variety of applications require a torque wrench affording the same torque limit. To some degree this feature is found in particular prior art torque wrenches.

Second, the torque wrench should be capable of having the limiting torque applicable thereby changed in a simple, rapid and reliable manner. While most torque wrenches can have the value changed by modifying the structure of the handle so as to increase the spring or other biasing pressure, none of the prior art torque wrenches enable the limiting torque to be changed in a simple, rapid and reliable (predictable) manner without any change in the spring or biasing value. (Attempts to vary the spring or biasing means strength in order to change the limiting torque are subject to human error in setting the adjustment mechanism and thus may not reliably obtain the desired limiting torque limitation.) This feature also increases the versatility, and hence the value, of the torque wrench as the same torque wrench may be used in situations requiring a variety of different limiting torques.

Third, the torque wrench should be operable without the sharp jarring which characterizes the operation of a conventional torque wrench once the point of maximum or limiting torque has been reached. In a conventional torque wrench, the energy stored in the springs or other biasing means is released in the instant after the maximum torque is achieved. This results in a jarring effect on the screw, bolt, bit or other article being driven, as well as to the user's hand. This is especially important in medical applications where the jarring of the article into the patient can be extremely detrimental. None of the conventional torque wrenches have a non-jarring design wherein the cam, which delivers the preset maximum torque, is designed such that it resets after reaching the preset maximum torque without jarring the output shaft.

Accordingly, it is an object of the present invention to provide a torque wrench which, in one preferred embodiment, is of non-jarring design.

Another object is to provide a torque wrench which, in one preferred embodiment, is capable of having the limiting or maximum torque simply, rapidly and reliably changed.

A further object is to provide a torque wrench which, in one preferred embodiment, has interchangeable output shafts so that a different drive tip may be associated with different output shafts.

It is also an object of the present invention to provide a torque wrench which, in one preferred embodiment, incorporates at least two, and preferably each, of the above mentioned features.

SUMMARY OF THE INVENTION

It has now been found that the above and related objects of the present invention are obtained in a torque wrench comprising a housing and an output shaft within the housing mounted for rotation about its central longitudinal axis. A clutch cam is located within the housing and operably connected to the output shaft for rotation therewith about the shaft central longitudinal axis, the clutch cam having an outer surface disposed along the shaft central longitudinal axis. A clutch follower is mounted within the housing for movement toward and away from the cam outer surface along an axis which is substantially transverse to the shaft central longitudinal axis. Means are provided for resiliently biasing the clutch follower into driving engagement with the cam outer surface, whereby rotation of the housing about the shaft central longitudinal axis will cause rotation of the output shaft. The clutch follower is movable by the cam outer surface against the biasing of the biasing means for disengagement of the clutch follower and the cam at a predetermined maximum torque on the output shaft. The torque wrench additionally includes at least one of the three features described below:

First, the cam outer surface extends in series from a flat of increasing resistance to rotation, through an arc of maximum resistance to rotation, to an extended arc of diminishing resistance to rotation, the cam outer surface having a minimum radius from the axis of rotation of the cam at the flat of increasing resistance, a maximum radius from the axis of cam rotation at the arc of maximum resistance, and intermediate radii from the axis of cam rotation at the extended arc of diminishing resistance. Preferably the cam outer surface at the extended arc of diminishing resistance from the arc of resistance to the flat of increasing resistance has a gradually decreasing radius the said axis of cam rotation such that the spring releases energy stored therein gradually and without jarring. The extended arc of diminishing resistance has a substantially constant radius of curvature, at least from a point intermediate the axis of cam rotation and the arc of maximum resistance.

Second, the clutch cam is operatively connected to the output shaft for movement therewith as a unit, and the housing includes stop means limiting movement of the clutch follower toward the cam outer surface, whereby the clutch cam and the output shaft are replaceably disposed within the housing. Preferably the clutch follower is restrained by the stop means when the planar surface of the cam outer surface is aligned with the clutch follower along the transverse axis at the flat of increasing resistance to rotation. Thus the drive tip of the output shaft is easily replaced by that of another output shaft.

Third, the cam outer surface defines a planar surface configured and dimensioned to be forcibly passed by the clutch follower when the clutch follower is restrained by the stop means. The cam outer surface also defines a non-planar surface which determines the predetermined maximum torque, the predetermined maximum torque therefore being switchable by replacing the cam/shaft unit in the housing with another such unit having the same planar surface and a different non-planar surface. Preferably the clutch cam and the output shaft are of unitary, one-piece, integral construction.

The present invention also encompasses a replaceable output shaft for a torque wrench. The shaft has adjacent one end thereof a clutch cam mountable at least partially within the housing of a torque wrench for rotation of the shaft about its central longitudinal axis. The outer surface of the cam extends in series from a flat of increasing resistance to rotation, through an arc of maximum resistance to rotation, to an extended arc of diminishing resistance to rotation, the cam outer surface having a minimum radius from the axis of rotation of the cam at the flat of increasing resistance, a maximum radius from the axis of cam rotation at the arc of maximum resistance, and intermediate radii from the axis of cam rotation at the extended arc of diminishing resistance.

In a preferred embodiment the cam outer surface at the extended arc of diminishing resistance from the arc of resistance to the flat of increasing resistance has a gradually decreasing radius from the axis of cam rotation, such that the spring releases energy stored therein gradually and without jarring. The extended arc of diminishing resistance has a substantially constant radius of curvature, especially from a point intermediate the axis of cam rotation and said arc of maximum resistance. The cam outer surface also defines a non-planar surface which determines the predetermined maximum torque, the predetermined maximum torque therefore being switchable by replacing the cam shaft unit in the housing with another such unit having the same planar surface and a different non-planar surface.

Preferably the clutch cam and the shaft are of unitary, one-piece, integral construction.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
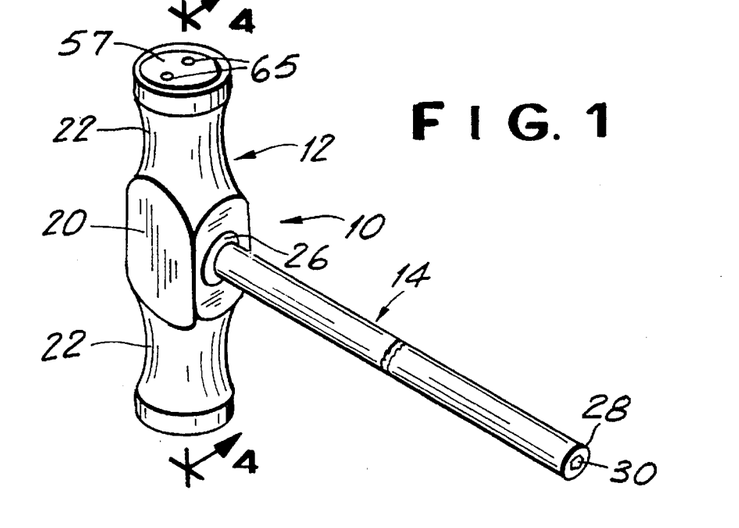
FIG. 1 is a fragmentary isometric view of a torque wrench according to the present invention.

Referring now to the drawing, and in particular to FIG. 1 thereof, therein illustrated is a torque wrench according to the present invention, generally designated by the reference numeral 10. The wrench 10 is of the "T"-shape type. The wrench 10 includes both a handle housing generally designated 12, and an output shaft, generally designated 14. The handle housing 12 includes a main body portion 20 and a pair of handles 22 extending laterally from the main body portion 20. The output shaft 14 includes a body portion with one end portion 26 releasably engaged by the housing body portion 20 and the other end portion 28 being a free end having a drive tip 30 (illustrated as a socket) adapted to act as a driving mechanism.

Figure 3:
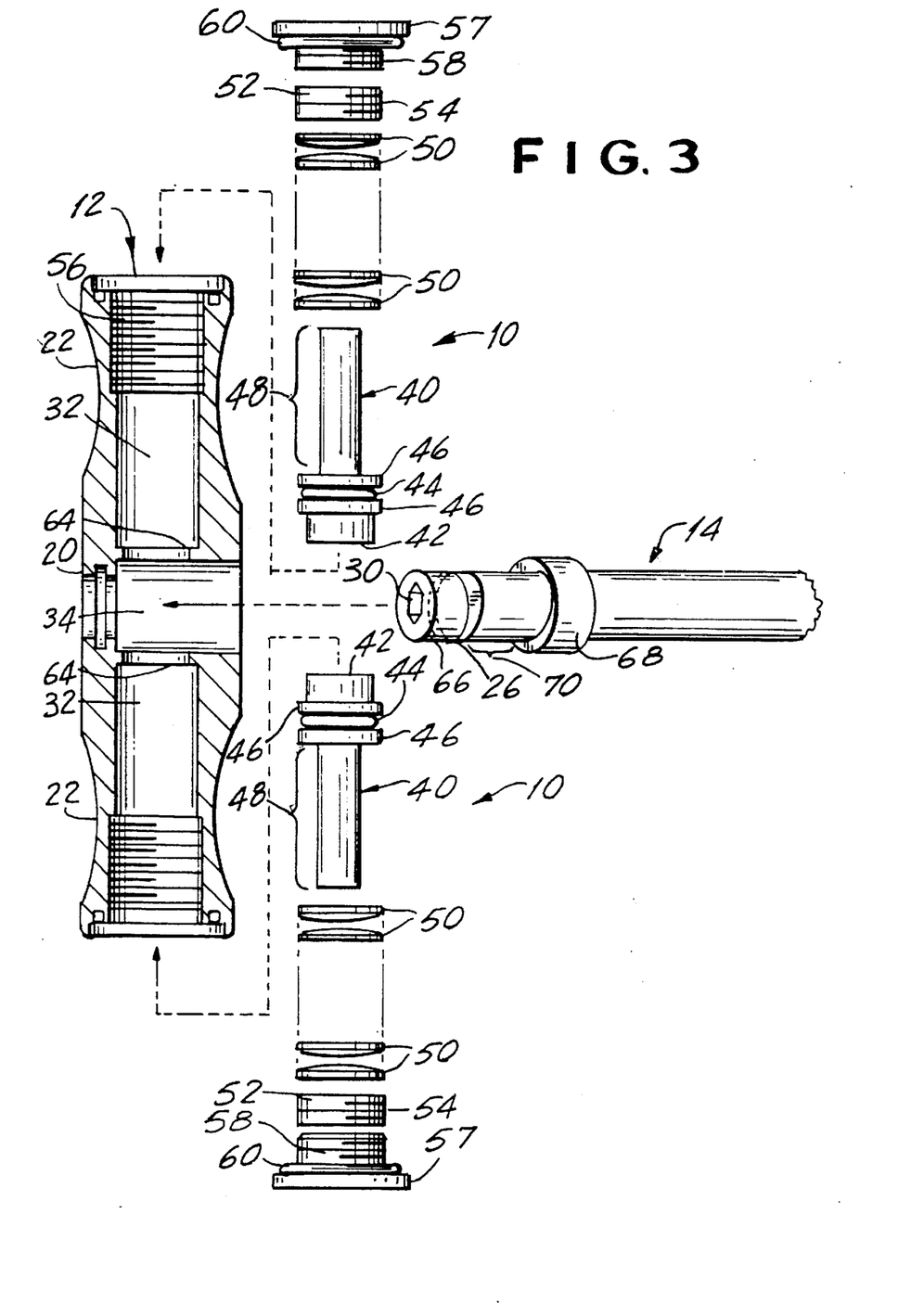
FIG. 3 is a fragmentary exploded isometric view of the torque wrench.
Figure 4:
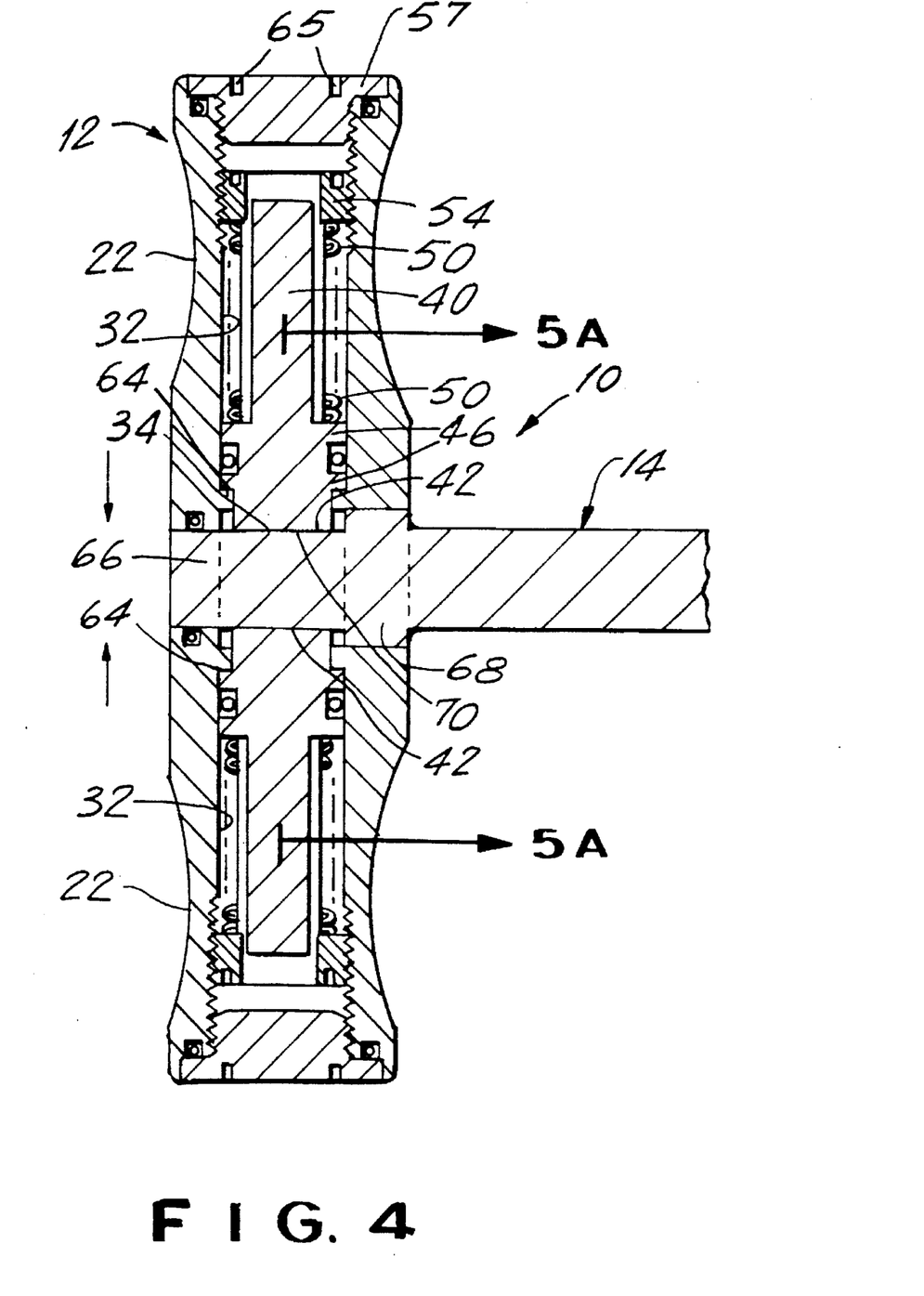
FIG. 4 is a fragmentary sectional view thereof at a point of no torque, taken along the line 4—4 of FIG. 1.

Referring now to FIG. 3 in particular, the handle housing 12 defines a longitudinally extending bore 32 therethrough, while the main body portion 20 defines a traversely extending bore 34 therethrough, the longitudinally and transversely extending bores 32, 34 being in operative communication.

The handles 22 preferably have an inwardly bowed surface configuration and dimensions which render them conducive to being manually grasped and rotated to develop torque. Disposed within the length of the longitudinal bore 32 extending through each handle 22 is a plunger, generally designated 40, having a cam follower surface 42 at an inner end thereof and an O-ring 44 mounted between a pair of shoulders 46. A plurality of Belleville washers or springs 50 (as illustrated, in the form of a curved metal washer) are disposed over the main body 48 of the plunger 40, the foremost washer 50 abutting against the outermost shoulder 46. Next outwardly, a pre-load adjustment nut 52 is mounted over the main body portion 48 of the plunger 40 and over the washers 50 with the external thread 54 thereof engaging the internal thread 56 of the outer end of the longitudinal bore 32. Appropriate rotation of the adjustment nut 52 relative to the bore 32 can vary the amount of pressure which the Belleville washers or other biasing means can exert inwardly on the outermost shoulder 46 of the plunger 40. Finally, a cap 57 is disposed in the outer end of the longitudinal bore 32 with its externally threaded body portion 58 being threadedly engaged in the outer portion of the internally threaded end 56 of longitudinal bore 32. An O-ring 60 may be mounted on the body portion 58 of cap 57.

Use of Belleville washers instead of springs is well known in the art, the Belleville washers being mounted in adjacent pairs with the convex surface of each member of the pair facing the convex surface of the other member of the pair.

While the cap 57 and O-ring 60 primarily preclude the entry of dirt and the like into the longitudinal bore 32, the pre-loaded adjustment nut 52, acting through the Belleville washers 50, biases the innermost shoulder 46 to bear on a stop shoulder 64 in the longitudinal bore 32. As best seen in FIG. 1, the cap 57 may be provided with recesses 65 to facilitate removal thereof and thus access to the adjustable locking nut 52. With the exception of the stop shoulder 64 within longitudinal bore 32 (for limiting plunger movement toward the shaft 14), the housing 12 is of conventional design. Accordingly, it is not deemed necessary to set forth additional details thereof herein.

The output shaft 14, adjacent the end 26 extending into and preferably through the housing body portion 20, has a shoulder portion 66 characterized by a circular outer circumference adapted to fit snugly within the transverse bore 34 and act as a bearing surface, a similar but larger shoulder portion 68 on the shaft body for the same purpose, and a non-circular cam portion, generally designated 70, therebetween.

Figure 2:
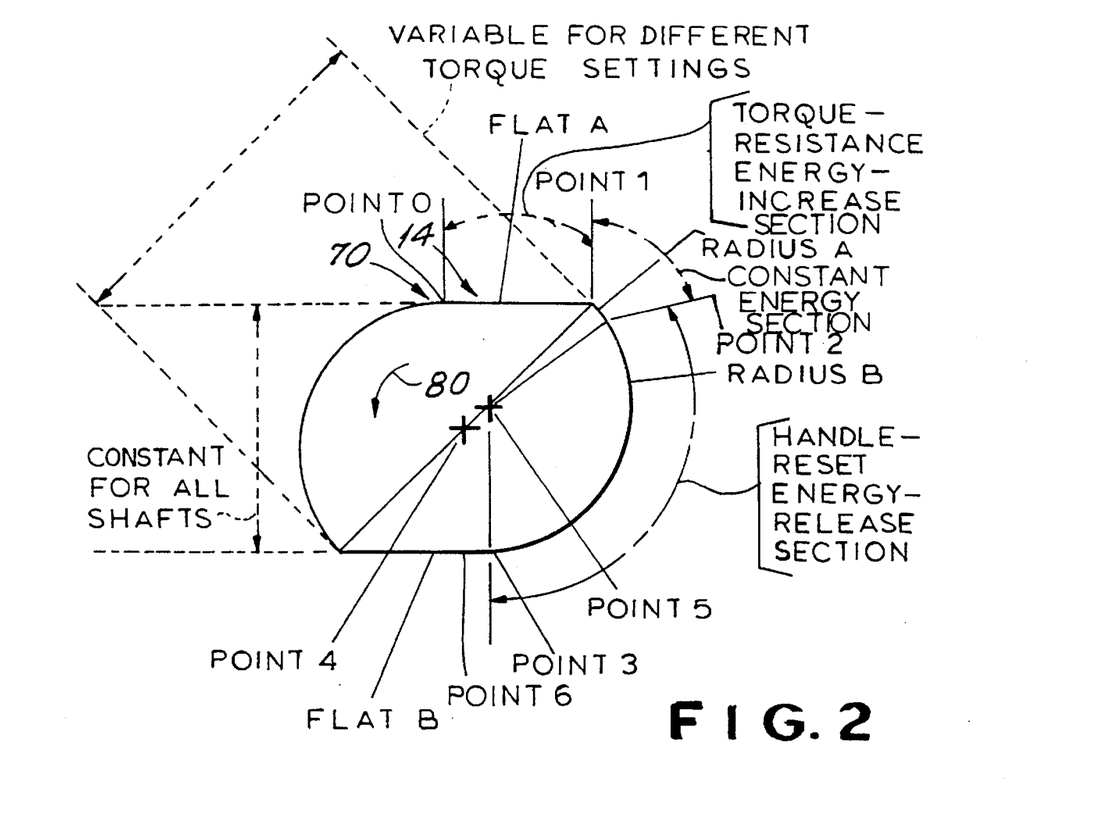
FIG. 2 is a sectional view of the cam lobe of the output shaft thereof.

Referring now to FIG. 2 in particular, therein illustrated is the cam lobe 70, which is disposed intermediate shoulder portions 66, 68 and enables the non-jarring action of the torque wrench of the present invention. The particular cam lobe 70 illustrated and discussed below is designed to produce two cycles of torque wrenching for each full rotation of the wrench housing 12. However, as will be apparent to those skilled in the art, the design of the cam lobe 70 may be modified to provide four, six or more even-numbered cycles per full rotation of the housing 12. The cam lobe 70 is defined by a pair of parallel surfaces or flats A, B, the flats A, B being connected by two arcuate portions 1-2 or 2-3 which will be explained in further detail herein below. The transverse spacing between the flats A, B is the same for all output shafts 14 intended for use with the same housing 12. Each flat is the beginning of a new cycle.

Considering now the first cycle, the cam lobe 70 has a center point 4 and an off-center point 5. The off-center point 5 is on a line from the center point 4 to the end of the arc segment 1-2 (defined by points 1 and 2)—i.e., point 2.

The first cycle begins with the handle being twisted clockwise relative to the output shaft 14 (so that, in effect, the cam lobe 70 is turning counterclockwise, relative to the housing 12, as illustrated by the arrow 80 of FIG. 2). An ever-increasing, but initially only moderate, force is required to force the cam follower 42 along the length of flat A from point 0 towards point 1. During this stage of rotation the Belleville washers yield relatively easily, but with increasing difficulty, to allow the plungers 40 to withdraw from the central axis as the effective radius of the cam lobe 70 on the cam follower 42 increases to a maximum where the maximum limiting torque is effected.

Immediately following flat A (in the clockwise direction) is a short segment of arc having a constant radius A from center point 4, the segment beginning at point 1 (at the end of the flat A) and ending at point 2. The distance between points 1 and 2 is characterized by an absence of any change in the torque resistance energy exerted by the Belleville washers 50 in the housing 12 and which continue to exert the maximum limiting torque so that there is a constant torque resistance energy exerted by the Belleville washers 50.

Thereafter, the arc continues a substantially longer way from point 2 to point 3 (until the beginning of the flat B) with a radius B measured from off-center point 5. This segment, from point 2 to point 3, is characterized by a handle-reset energy-release, wherein the energy built up within the Belleville washers 50 in overcoming the maximum torque resistance is released slowly and without jarring of the wrench. At the end of the arcuate portion (that is, at point 3), flat B begins. Point 6 of flat B which continues to point 6 is where the second cycle begins.) Thus, the description of the movement of cam lobe 70 from point 0 on flat A to point 6 on flat B describes one cycle, half of the full rotation of the torque wrench.

Radius A and radius B are tangent at point 2; that is, at that point they touch and, indeed, coincide. Thus it will be appreciated that radius B is smaller than radius A at all times. It will also be appreciated that radius A determines the limiting torque and is a variable for different limiting torque settings.

It is critical to an understanding of the present invention that the radius A is relative to (has as the center of the circle) the center point 4 of cam lobe 70 (the axis of rotation about which the housing 12 and cam lobe 70 rotate), while the radius B is relative to (has as the center of its circle) the off-center point 5. Thus the length of radius B varies (i.e., diminishes with rotation of the handles) relative to center point 4, although it is constant with respect to off-center point 5. The resultant curvature of the arc segment 2-3 enables the gradual release of the energy built up in the spring or other bias system of the torque wrench once the limiting torque value has been achieved.

Figure 5A:
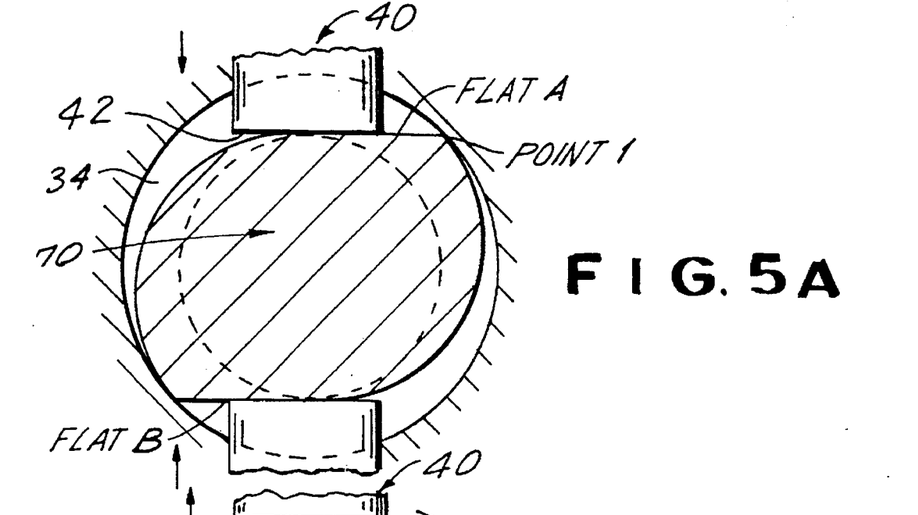
FIGS. 5A, 5B and 5C are fragmentary sectional views showing the cam and cam followers in a position of no torque, maximum torque, and decreasing torque, respectively, with FIG. 5A being a sectional view taken along the line 5A—5A of FIG. 4 and FIG. 5C being a sectional view taken along the line 5C—5C of FIG. 6.
Figure 5B:
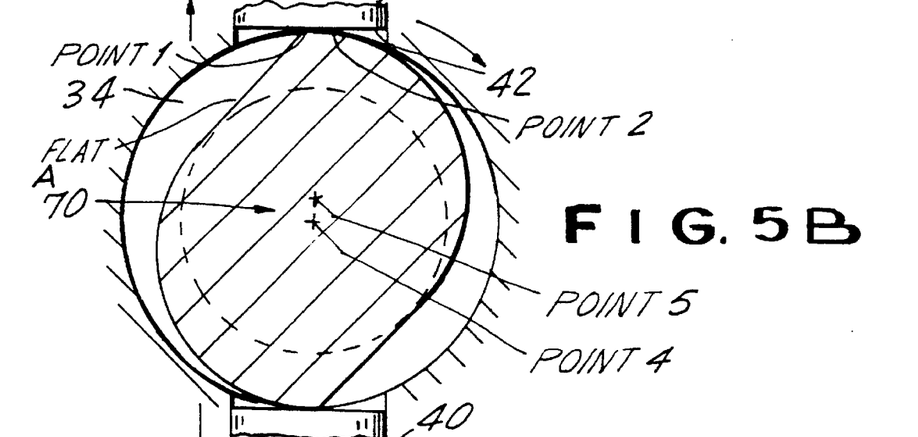
Figure 5C:
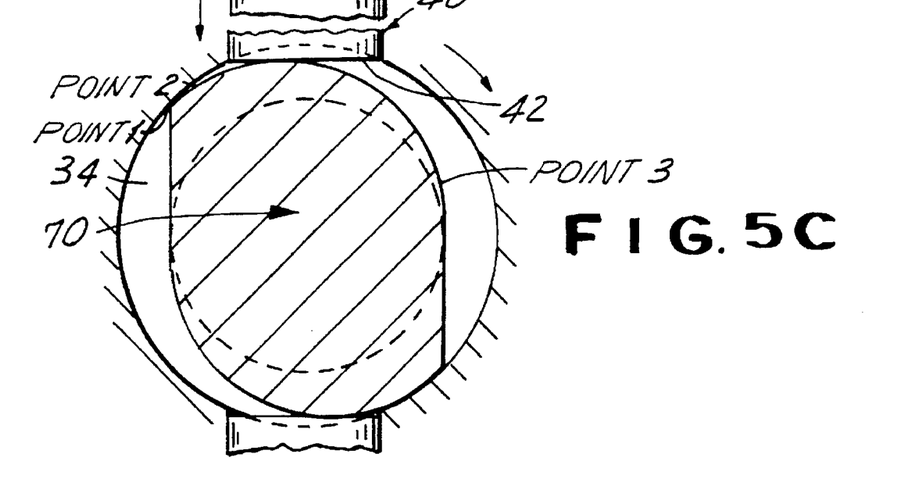
Figure 6:
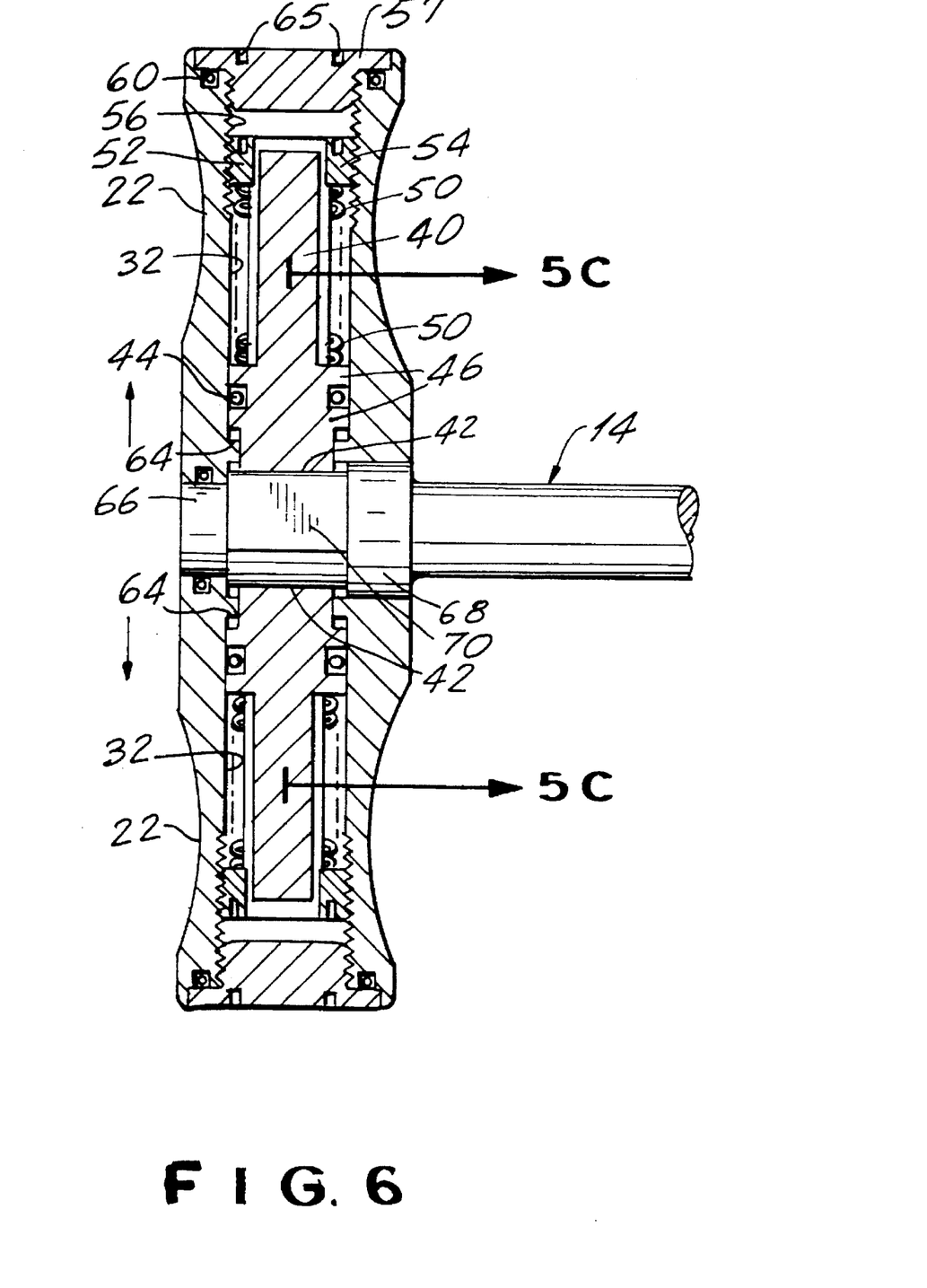
FIG. 6 is a sectional view of the torque wrench at a point of maximum torque.

Referring now to FIGS. 5A, 5B and 5C, in the initial position shown in FIG. 5A, the cam follower surface 42 of one plunger 40 will be located on flat A, and the cam follower surface 42 of the other plunger 40 will be on flat B. When enough torque is applied to the handles 22 of housing 12 to overcome the spring force of the Belleville washers 50 on the outer plunger flanges 46, the plungers withdraw increasingly into the handles 22 as the cam lobe 70 rotates relative to the housing 12 in a counterclockwise motion (as illustrated by arrow 80 in FIG. 2). The resistance to the applied torque will increase over flat A until it reaches a maximum when the cam follower 42 is resting not on a flat, but rather on the beginning of the arcuate portion, point 1, as illustrated in FIG. 5B. The maximum torque resistance occurs when point 1, point 2 or any point along the arc segment 1-2 is located on a line from center point 4 perpendicular to the cam follower surface 42 of the plunger 40. This maximum torque resistance is maintained until the cam follower surface 42 of the plunger 40 passes the point 2 (at the end of the torque-resistance energy-increase segment).

At this point, the energy stored in the Belleville washers 50 by the outward retreat of the plungers 40 is now at a maximum. The stored energy must now be released slowly in order to avoid a sudden jarring of the output shaft 14. This is effected, as illustrated in FIG. 5C, by gradually releasing energy as the housing further rotates until the cam follower surface 42 of plunger 40 is at point 3. During this time, radius B, which sweeps an arc from point 2 to point 3, is a relatively long radius and thus releases the stored energy in the Belleville washers slowly because the outer surface 2-3 of the cam lobe 70 of the handle-reset energy-release section is farther from the center point 4 than point 3 (at the end of the handle-reset energy-release section) is from the center point 4. At this point, the cam follower face 42 of plunger 40 will rest on flat B, having effected one cycle of the wrench.

FIG. 5A illustrates the situation where the cam followers 42 rest on the beginning of flats A, B, exerting little if any force thereon as the plungers 40 are supported on the stop shoulders 64. In FIG. 5B, the rotation of the housing 12 in a clockwise direction (or a relative movement of the output shaft 14 in a counterclockwise direction relative to the housing 12) has increased the force on the cam followers 42 and brought the cam followers 42 to the torque-resistance energy-increase section where radius A controls. It will be appreciated that the rotation of cam lobe 70 has caused an outward retreat of the plungers 40 such that in FIG. 5B the cam followers 42 are disposed essentially outside of the transverse bore 34. In FIG. 5C, the further rotation of the housing relative to the output shaft in the clockwise direction has resulted in the cam followers 42 of plungers 40 being supported by the handle-reset energy-release section. As the radius B thereof is necessarily less than the radius A from the center point 4 of the cam lobe 70, the plungers 40 have started to move inwardly slightly, such that the cam followers 42 are now well within the transverse bore 34.

While the use of a radius B from an off-center point 5, provides an optimum non-jarring energy release during handle resetting (that is, in preparation for the next torquing cycle), various other arrangements will also be satisfactory and reduce the jarring effect. Thus the off-center point 5 need not be disposed exactly on a radius between the center point 4 and the arc segment 1-2.

Thus the separation of the flats A, B does not affect the limiting torque exertable by the wrench, this being a function only of the radius A characterizing the torque-resistance energy-increase section. (As radius A is increased, the maximum limiting torque is also increased.) It is possible, therefore, to substitute for an output shaft providing one limiting torque another output shaft providing a different limiting torque, but having the same transverse separation between the parallel flats A, B. The replacement output shaft will still fit between the cam follower surfaces 42 of the plungers 40 when they are maintained a fixed distance apart by the abutment of the plungers 40 against the stop shoulders 64 of the housing.

Where a non-jarring feature is not required, the ability of the output shafts to be replaceable with one another may be achieved simply by maintaining a fixed separation between the flats A, B of the various cam lobes 70 without regard to the radius B of the handle-reset energy-release section. Indeed, radius B may simply follow a straight line from point 2 to point 3.

Similarly, where a multiple-limiting torque-wrench feature is not desired, the non-jarring feature may still be obtained by removal of stop shoulders 64 from the longitudinal bore 32 of the housing 12.

The interchangeability of the output shafts 14 with a given housing 12 clearly enables the torque wrench to drive a plurality of drive tips where each output shaft 14 has its free end 28 (and optionally its other end) defining an appropriate drive tip 30.

Figure 7:
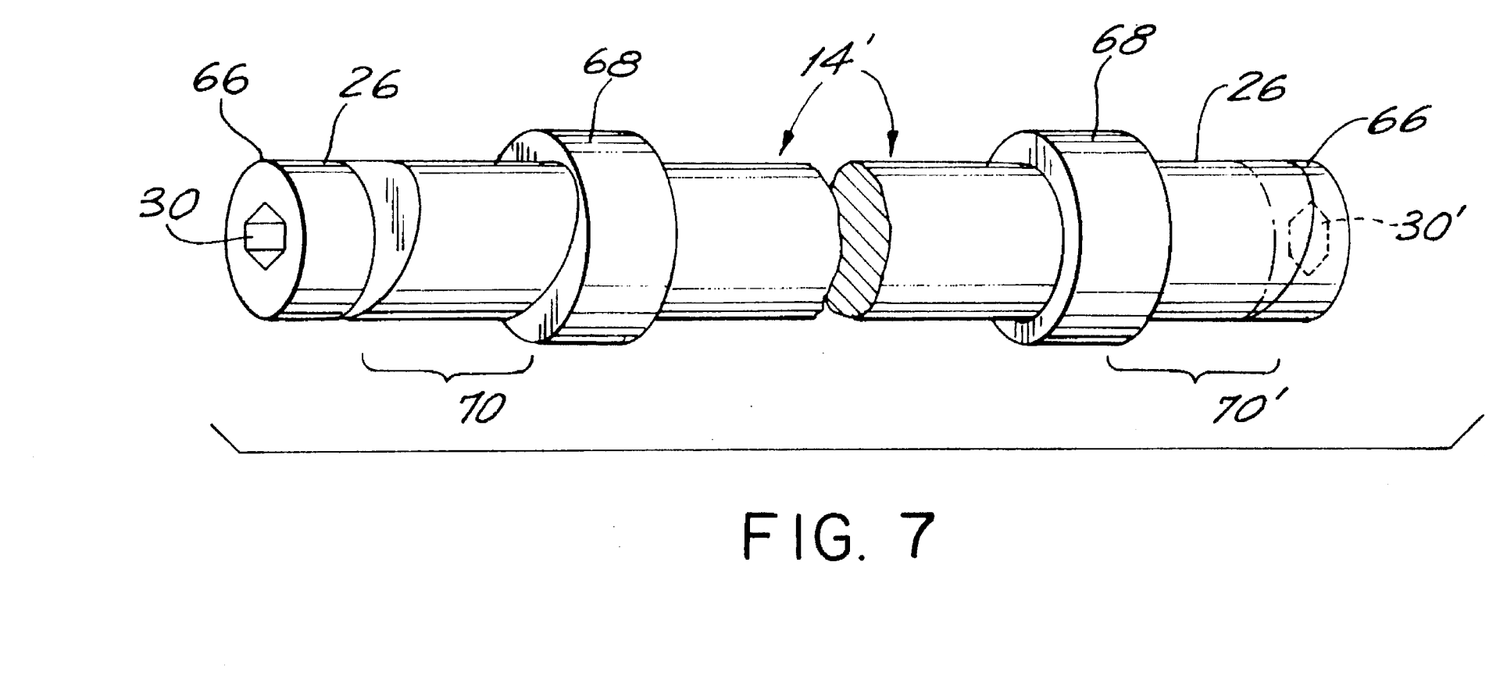
FIG. 7 is an isometric view of an output shaft capable of providing different maximum torques.

Referring now to FIG. 7, therein illustrated is an output shaft 14' wherein there is a cam lobe 70, 70' adjacent each end 26, 28. The driving tips 30, 30' at each end may differ from one another to enable the driving of two different drive configurations with a single output shaft 14' simply by removing, reversing and re-inserting the output shaft into the housing 12. Alternatively, the drive tips 30, 30' at each end 26, 28 may be the same, but with the two cam lobes 70, 70' differing in their radius A so that a different limiting torque value may be achieved simply by removing, reversing and re-inserting the output shaft into the housing. Finally, if desired, both the drive tips 30, 30' at each end of the output shaft 14' may differ, and the radius A of each cam lobe 70, 70' may differ, so that the operator can call into play a different drive tip and a different limiting torque, both simply by removing, reversing and re-inserting a single output shaft into the housing.

To summarize, the present invention provides a torque wrench which, in a preferred embodiment, is of non-jarring design, is capable of having the limiting or maximum torque simply, rapidly and reliably changed, or has interchangeable output shafts so that a different drive tip may be associated with different output shafts. Preferably, the wrench incorporates at least two and preferably each, of the above mentioned features.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. In a torque wrench comprising:
   (A) a housing;
   (B) an output shaft mounted within said housing for rotation about the central longitudinal axis thereof relative to said housing;
   (C) a clutch cam located within said housing and operatively connected to said output shaft for rotation therewith about said shaft central longitudinal axis, said clutch cam having an outer surface disposed along and about said shaft central longitudinal axis;
   (D) a clutch follower mounted within said housing and bearing on said cam outer surface for movement toward and away from said shaft central longitudinal axis along an axis which is substantially transverse to said shaft central longitudinal axis; and
   (E) means for resiliently biasing said clutch follower into driving engagement with said cam outer surface, whereby rotation of said housing about said shaft central longitudinal axis will cause rotation of said output shaft;
   said clutch follower being movable by said cam outer surface against the biasing of said biasing means for disengagement of said clutch follower and said cam at a predetermined maximum torque on said output shaft;
   the improvement wherein said cam outer surface extends in series from a flat causing increasing resistance to rotation, through an arc causing maximum resistance to rotation, to an extended arc causing diminishing resistance to rotation, said cam outer surface having a minimum radius from an axis of rotation of said cam at said flat causing increasing resistance, a maximum radius greater than said minimum resistance from the axis of cam rotation at said arc causing maximum resistance, and intermediate radii from the axis of cam rotation at said extended arc causing diminishing resistance.

2. The torque wrench of claim 1 wherein said cam outer surface at said extended arc causing diminishing resistance from said arc causing maximum resistance to said flat causing increasing resistance has a gradually decreasing radius from said axis of cam rotation such that said biasing means releases energy stored therein gradually and without jarring.

3. The torque wrench of claim 2 wherein said extended arc causing diminishing resistance has a substantially constant radius of curvature.

4. The torque wrench of claim 2 wherein said extended arc causing diminishing resistance has a substantially constant radius of curvature from a point intermediate said axis of cam rotation and said arc causing maximum resistance.

5. In a torque wrench comprising:
   (A) a housing;
   (B) an output shaft mounted within said housing for rotation about the central longitudinal axis thereof relative to said housing;
   (C) a clutch cam located within said housing and operatively connected to said output shaft for rotation therewith about said shaft central longitudinal axis, said clutch cam having an outer surface disposed along and about said shaft central longitudinal axis;
   (D) a clutch follower mounted within said housing and bearing on said cam outer surface for movement toward and away from said shaft central longitudinal axis along an axis which is substantially transverse to said shaft central longitudinal axis; and
   (E) means for resiliently biasing said clutch follower into driving engagement with said cam outer surface, whereby rotation of said housing about said shaft central longitudinal axis will cause rotation of said output shaft;

said clutch follower being movable by said cam outer surface against the biasing of said biasing means for disengagement of said clutch follower and said cam at a predetermined maximum torque on said output shaft;

the improvement wherein said clutch cam is operatively connected to said output shaft for movement therewith as a unit, and said housing includes stop means limiting movement of said clutch follower toward said cam outer surface, whereby said clutch cam and said output shaft are replaceably disposed within said housing.

6. The torque wrench of claim 5 wherein said cam outer surface defines a planar surface configured and dimensioned to be forced past said clutch follower when said clutch follower is restrained by said stop means.

7. The torque wrench of claim 6 wherein said cam outer surface also defines a non-planar surface which determines the predetermined maximum torque, the predetermined maximum torque therefore being switchable by replacing said cam/shaft unit in said housing with another such unit having the same planar surface and a different non-planar surface.

8. The torque wrench of claim 6 wherein said clutch cam and said output shaft are of unitary, one-piece, integral construction.

9. In a torque wrench comprising:

(A) a housing;

(B) an output shaft mounted within said housing for rotation about the central longitudinal axis thereof relative to said housing;

(C) a clutch cam located within said housing and operatively connected to said output shaft for rotation therewith about said shaft central longitudinal axis, said clutch cam having an outer surface disposed along and about said shaft central longitudinal axis;

(D) a clutch follower mounted within said housing and bearing on said cam outer surface for movement toward and away from said shaft central longitudinal axis along an axis which is substantially transverse to said shaft central longitudinal axis; and (E) means for resiliently biasing said clutch follower into driving engagement with said cam outer surface, whereby rotation of said housing about said shaft central longitudinal axis will cause rotation of said output shaft;

said clutch follower being movable by said cam outer surface against the biasing of said biasing means for disengagement of said clutch follower and said cam at a predetermined maximum torque on said output shaft;

the improvement wherein said cam outer surface extends in series from a flat causing increasing resistance to rotation, through an arc causing maximum resistance to rotation, to an extended arc causing diminishing resistance to rotation, said cam outer surface having a minimum radius from an axis of rotation of said cam at said flat causing increasing resistance, a maximum radius greater than said minimum radius from the axis of cam rotation at said arc causing maximum resistance, and intermediate radii from the axis of cam rotation at said extended arc causing diminishing resistance; said cam outer surface at said extended arc causing diminishing resistance from said arc causing maximum resistance to said flat causing increasing resistance has a gradually decreasing radius from the axis of cam rotation such that said biasing means releases energy stored therein gradually and without jarring; and wherein said clutch cam is operatively connected to said output shaft for movement therewith as a unit, said housing includes stop means limiting movement of said clutch follower toward said cam outer surface, and said cam outer surface defines a planar surface configured and dimensioned to be forced past said clutch follower when said clutch follower is restrained by said stop means, whereby said clutch cam and said output shaft are replaceably disposed within said housing, and a non-planar surface which determines the predetermined maximum torque, whereby the predetermined maximum torque is switchable by replacement of said cam/shaft unit in said housing with another such unit having the same planar surface and a different non-planar surface.

10. The torque wrench of claim 9 wherein said clutch follower is restrained by said stop means when said planar surface of said cam outer surface is aligned with said clutch follower along said transverse axis at said flat causing increasing resistance to rotation.

11. A replaceable output shaft for a torque wrench, comprising a shaft having adjacent one end thereof a clutch cam mountable at least partially within a housing of a torque wrench for rotation of the shaft about the central longitudinal axis; the outer surface of said cam extending in series from a flat causing increasing resistance to rotation, through an arc causing maximum resistance to rotation, to an extended arc causing diminishing resistance to rotation, said cam outer surface having a minimum radius from the axis of rotation of said cam at said flat causing increasing resistance, a maximum radius from the axis of cam rotation at said arc causing maximum resistance, and intermediate radii from the axis of cam rotation at said extended arc causing diminishing resistance.

12. The output shaft of claim 11 wherein said cam outer surface at said extended arc causing diminishing resistance from said arc causing maximum resistance to said flat causing increasing resistance has a gradually decreasing radius from said axis of cam rotation.

13. The output shaft of claim 12 wherein said extended arc causing diminishing resistance has a substantially constant radius of curvature.

14. The output shaft of claim 12 wherein said extended arc causing diminishing resistance has a substantially constant radius of curvature from a point intermediate said axis of cam rotation and said arc causing maximum resistance.

15. The output shaft of claim 11 wherein said cam outer surface also defines a non-planar surface which determines the predetermined maximum torque, the predetermined maximum torque therefore being switchable by replacing said cam/shaft unit in said housing with another such unit having the same planar surface and a different non-planar surface.

16. The output shaft of claim 11 wherein said clutch cam and said shaft are of unitary, one-piece, integral construction.

17. The output shaft of claim 11 wherein said cam outer surface extends in series from a flat causing increasing resistance to rotation, through an arc causing maximum resistance to rotation, to an extended arc causing diminishing resistance to rotation, said cam outer surface having a minimum radius from the axis of rotation of said cam at said flat causing increasing resistance, a maximum radius from the axis of cam rotation at said arc causing maximum resistance, and intermediate radii from the axis of cam rotation at said extended arc causing diminishing resistance; said cam outer surface at said extended arc causing diminishing resistance from said arc causing maximum resistance to said flat causing increasing resistance has a gradually decreasing radius from said axis of cam rotation such that energy stored in a spring is released gradually and without jarring.

* * * * *